No. 844,916. PATENTED FEB. 19, 1907.
R. BORDER.
VEHICLE AXLE.
APPLICATION FILED MAY 1, 1905.
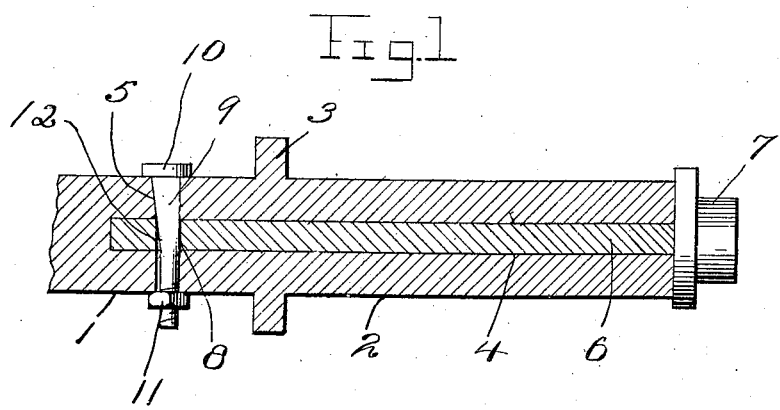
Fig. 1
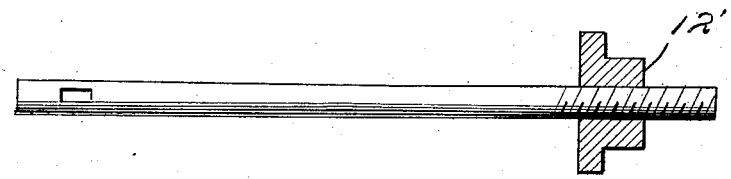
Fig. 2.
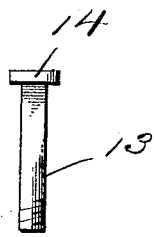
Fig. 3.
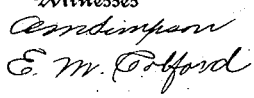

UNITED STATES PATENT OFFICE.

REBECCA BORDER, OF EVERETT, PENNSYLVANIA.

VEHICLE-AXLE.

No. 844,916.  Specification of Letters Patent.  Patented Feb. 19, 1907.

Application filed May 1, 1905. Serial No. 258,232.

*To all whom it may concern:*

Be it known that I, REBECCA BORDER, a citizen of the United States, residing at Everett, in the county of Bedford, State of Pennsylvania, have invented certain new and useful Improvements in Vehicle-Axles; and I do hereby declare the following to be a full, clear, and exact description of the invention, such as will enable others skilled in the art to which it appertains to make and use the same.

This invention relates to nuts, and more particularly to means for preventing vehicle-wheels accidentally leaving their axles.

One object of the invention is to provide an exceedingly simple, inexpensive, durable, and efficient means for positively locking vehicle-wheels upon their axles.

Another object of the invention resides in the provision of a nut having an extension fitted longitudinally in the axle and held therein by a wedging or other locking key.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the present invention.

In the drawings, Figure 1 is a longitudinal sectional view of a portion of an axle. Fig. 2 is an elevation, partly in section, illustrating a modified form of nut. Fig. 3 is an elevation of a modified form of locking-key.

Referring now more particularly to the accompanying drawings, the reference character 1 designates an axle having the usual spindle 2, provided with a collar 3, designed to limit the inward movement of the wheel (not shown) upon its spindle. In the present instance the spindle is provided with a central longitudinal bore 4, extending beyond the collar 3 and into the axle 1, there being a slot 5 formed in the axle in advance of the collar 3, the slot intersecting the said longitudinal bore 4 and extending from the top to the bottom of the axle.

The outer end of the shank or stem 6 of the nut is provided with an integral head 7, designed to abut against the outer end of the hub of a wheel, the inner end of the shank or stem having a slot 8, designed to register with the slot 5 of the axle, there being a key whose shank portion 9 fits the alining slots 5 and 8. The key is provided with a head 10 and has its opposite extremity screw-threaded for working fit with the ordinary nut 11, one side edge of the shank or stem of the key being tapered upwardly, as at 12, whereby the key may be wedged in the said alining slots and tend to draw the shank 6 into its seat or bore as the key is driven home, and in view of which, even if the nut 11 should become accidentally displaced, the wedging action of the bolt would prevent outward movement of the stem 6. It will be observed that the slot 5 is elongated to permit the inward drawing of the shank 6 incident to the aforesaid wedging action.

If desired, the outer end of the stem or shank 6 may be screw-threaded for the reception of the flanged cap-nut 12', as shown in Fig. 2.

It will thus be seen that the vehicle-wheel will be positively locked upon the spindle or axle and that the means for accomplishing the purpose is very simple and inexpensive.

In Fig. 3 there is shown a modified form of locking-key, wherein the key has a shank 13, rectangular in form and not provided with the beveled edge, as in the other form of key-pin. However, this secured key 14 has a tight fit with the alining slots of the axle and shank of the locking-nut.

What is claimed is—

The combination with an axle having a longitudinal bore, of a nut having a shank fitted in said bore, said axle and said shank having registering slots, a headed key engaged through said slots, said key having a single wedge-face extending from the said head to the middle of the key, the slot in the shank being of greater length than the width of the key adjacent to its middle, and a nut engaged upon the key.

In testimony whereof I affix my signature in presence of two witnesses.

REBECCA BORDER.

Witnesses
J. C. BARNDOLLAR,
G. W. RICHEY.